(12) United States Patent
Guthermann (10) Patent No.: US 12,555,662 B2
(45) Date of Patent: Feb. 17, 2026

(54) PORTABLE MEMORY DEVICE FOR USE WITH AN INFUSION DEVICE

(71) Applicant: Sanofi, Paris (FR)

(72) Inventor: Joshua Guthermann, Bridgewater, NJ (US)

(73) Assignee: Sanofi, Paris (FR)

( * ) Notice: Subject to any disclaimer, the term of this patent is extended or adjusted under 35 U.S.C. 154(b) by 107 days.

(21) Appl. No.: 17/795,353

(22) PCT Filed: Feb. 1, 2021

(86) PCT No.: PCT/EP2021/052292
§ 371 (c)(1),
(2) Date: Jul. 26, 2022

(87) PCT Pub. No.: WO2021/156197
PCT Pub. Date: Aug. 12, 2021

(65) Prior Publication Data
US 2023/0056279 A1 Feb. 23, 2023

(30) Foreign Application Priority Data
Feb. 3, 2020 (EP) .................. 20305095

(51) Int. Cl.
*G16H 20/17* (2018.01)
*G06F 3/06* (2006.01)

(52) U.S. Cl.
CPC .......... *G16H 20/17* (2018.01); *G06F 3/0605* (2013.01); *G06F 3/0659* (2013.01); *G06F 3/0673* (2013.01)

(58) Field of Classification Search
CPC ........ G16H 20/17; G16H 40/40; G16H 40/60; G06F 3/0605; G06F 3/0659; G06F 3/0673
(Continued)

(56) References Cited

U.S. PATENT DOCUMENTS

2004/0128162 A1* 7/2004 Schlotterbeck ........ G16H 20/17
702/45
2008/0091139 A1* 4/2008 Srinivasan .............. A61M 5/30
604/68

(Continued)

FOREIGN PATENT DOCUMENTS

| CN | 1759398 A | 4/2006 |
|---|---|---|
| CN | 107890594 | 4/2018 |

(Continued)

OTHER PUBLICATIONS

International Preliminary Report on Patentability in International Appln. No. PCT/EP2021/052292, mailed on Aug. 18, 2022, 10 pages.

(Continued)

*Primary Examiner* — Kambiz Abdi
*Assistant Examiner* — Tran N Nguyen
(74) *Attorney, Agent, or Firm* — Fish & Richardson P.C.

(57) ABSTRACT

A portable memory device for use with an infusion device, the portable memory device comprising a memory including information that, when received by the infusion device, causes the infusion device to set a predefined infusion rate; and output a confirmation that the infusion device has been properly programmed with the predefined infusion rate; wherein the portable memory device is configured to automatically transmit the information to the infusion device in response to the portable memory device being brought into a transmitting position with respect to the infusion device.

17 Claims, 5 Drawing Sheets

(58) Field of Classification Search
USPC .......................................................... 705/2–3
See application file for complete search history.

(56) References Cited

U.S. PATENT DOCUMENTS

| | | | |
|---|---|---|---|
| 2009/0156990 A1 | 6/2009 | Wenger et al. | |
| 2010/0010581 A1 | 1/2010 | Goetz et al. | |
| 2011/0060758 A1* | 3/2011 | Schlotterbeck | G16H 20/17 |
| | | | 707/769 |
| 2011/0098674 A1* | 4/2011 | Vicente | G06F 1/1684 |
| | | | 713/503 |
| 2011/0257798 A1 | 10/2011 | Ali et al. | |
| 2013/0201316 A1* | 8/2013 | Binder | H04L 67/12 |
| | | | 701/2 |
| 2013/0283030 A1 | 10/2013 | Drew | |
| 2013/0296837 A1* | 11/2013 | Burnett | A61F 7/123 |
| | | | 606/22 |
| 2014/0066892 A1* | 3/2014 | Keenan | A61B 5/14532 |
| | | | 604/506 |
| 2016/0000994 A1* | 1/2016 | Blomquist | G16Z 99/00 |
| | | | 604/500 |
| 2016/0184511 A1 | 6/2016 | Wenger et al. | |
| 2016/0327298 A1* | 11/2016 | Sinha | F24F 11/63 |
| 2022/0105269 A1* | 4/2022 | Zhong | A61B 5/746 |

FOREIGN PATENT DOCUMENTS

| | | |
|---|---|---|
| CN | 110168661 A | 8/2019 |
| JP | 2006-500087 A | 1/2006 |
| JP | 2006-520949 A | 9/2006 |
| JP | 2012-034729 A | 2/2012 |
| WO | WO 2004/012787 A2 | 2/2004 |
| WO | WO 2004/070557 A2 | 8/2004 |

OTHER PUBLICATIONS

International Search Report and Written Opinion in International Appln. No. PCT/EP2021/052292, mailed on Apr. 30, 2021, 12 pages.

* cited by examiner

PORTABLE MEMORY DEVICE FOR USE WITH AN INFUSION DEVICE

CROSS REFERENCE TO RELATED APPLICATIONS

The present application is the national stage entry of International Patent Application No. PCT/EP2021/052292, filed on Feb. 1, 2021, and claims priority to Application No. EP 20305095.0, filed on Feb. 3, 2020, the disclosures of which are incorporated herein by reference.

TECHNICAL FIELD

The present disclosure relates to a portable memory device for programming an infusion device and to an infusion device configured to be programmed by the portable memory device.

BACKGROUND

A variety of diseases exists that require regular treatment by injection of a medicament by either subcutaneous or intravenous routes of administration. Such injection can be performed by using injection devices, which are prepared and operated either by medical personnel or by patients themselves. As an example, type-1 and type-2 diabetes can be treated by patients themselves by subcutaneous injection of insulin doses, for example once or several times per day. The insulin may be administered by an infusion device, also known as an infusion pump.

Currently there are two broad categories of infusion pumps available: 1) full featured pumps that require the user to manually adjust the infusion rate or select the rate from an existing menu manually and; 2) pre-set infusion pumps that are programmed to only deliver at a pre-set infusion rate.

Currently, most hospital or clinic-based infusion pumps require the nurse, Health Care Professional or patient to manually select the correct drug and concentration to be infused from a built in menu of options and/or to then program the correct infusion rate. In the context of insulin infusion pumps, there is an emerging trend toward developing simple to use insulin pumps for segments of the patient population that do not wish to use full featured pumps due to their complexity. A number of pre-set infusion pumps have been introduced that require the manufacturer to develop and manage a variety of pre-set devices each with a unique pre-set infusion rate. This necessity leads to potentially increased costs and complexity associated with both manufacturing and distribution management.

A need exists to retain simplicity for the patient by not requiring manual programming of the infusion pump while also simplifying the manufacturing and supply chain management process. A need also exists to reduce the chances of infusion pumps being incorrectly programmed, both by patients and Health Care Professionals.

SUMMARY

A first aspect disclosed herein provides a portable memory device for use with an infusion device, the portable memory device comprising a memory including information that, when received by the infusion device, causes the infusion device to:
set a predefined infusion rate; and
output a confirmation that the infusion device has been properly programmed with the predefined infusion rate;
wherein the portable memory device is configured to automatically transmit the information to the infusion device in response to the portable memory device being brought into a transmitting position with respect to the infusion device.

The information may comprise an indication of one of a plurality of pre-set infusion programs stored on the infusion device.

The information may comprise executable instructions configured to be executed by the infusion device to cause the infusion device to set the predefined infusion rate.

A colour of the portable memory device may be correlated with the predefined infusion rate.

The read only memory may further include data relating to the predefined infusion rate and may be further configured to automatically transmit the data relating to the predefined infusion rate to the infusion device when the portable memory device is brought into a transmitting position with respect to the infusion device.

The memory may be a read only memory. The information, when received by the infusion device, may further cause the infusion device to prevent any change in the predefined infusion rate until a further portable memory device is brought into a transmitting position with respect to the infusion device.

The transmitting position may require the portable memory device to be inserted into a port of the infusion device. The transmitting position may require the portable memory device to be placed against a housing of the infusion device. The transmitting position may be a non-contact position.

The portable memory device may be configured to use a radio frequency band to transmit information to the infusion device.

A second aspect disclosed herein provides a container of medicament configured to be connected to an infusion device such that the medicament contained in the container of medicament is deliverable by the infusion device, wherein the container of medicament comprises a portable memory device according to the first aspect.

A third aspect disclosed herein provides an infusion device configured for use with a portable memory device, the infusion device comprising:
  a receiver configured to receive information from a portable memory device in response to the portable memory device being brought into a transmitting position with respect to the infusion device; and
  a processor configured to read the information and in response to set a predefined infusion rate;
wherein the infusion device is further configured to automatically output a confirmation that the infusion device has been properly programmed with the predefined infusion rate.

The infusion device may further comprise a display device and wherein the confirmation that the infusion device has been properly programmed is visually displayed on the display device.

The infusion device may further comprise a speaker and wherein the confirmation that the infusion device has been properly programmed may be audibly indicated using the speaker.

The infusion device may further comprises one or more LEDs and wherein the confirmation that the infusion device has been properly programmed may be indicated using the one or more LEDs.

The one or more LEDs may comprise a plurality of differently coloured LEDs and wherein the confirmation that the infusion device has been properly programmed may comprise illuminating one of the plurality of differently coloured LEDs which corresponds to a colour of the portable memory device brought into a transmitting position with respect to the infusion device.

The infusion device may be further configured such that the predefined infusion rate set cannot be adjusted manually.

The infusion device may be further configured such that the predefined infusion rate set can be adjusted within a predefined range of the infusion rate set.

A fourth aspect disclosed herein provides a medical device system comprising an infusion device and a portable memory device for use with the infusion device, the portable memory device comprising:
- a memory including information that, when received by the infusion device, cause the infusion device to:
  - set a predefined infusion rate; and
  - output a confirmation that the infusion device has been properly programmed with the predefined infusion rate;

wherein the portable memory device is configured to automatically transmit the information to the infusion device in response to the portable memory device being brought into a transmitting position with respect to the infusion device; and the infusion device comprising:
- a receiver configured to receive the information from the portable memory device in response to the portable memory device being brought into the transmitting position with respect to the infusion device; and
- a processor configured to read the information and in response to set the predefined infusion rate;

wherein the infusion device is further configured to automatically output the confirmation that the infusion device has been properly programmed with the predefined infusion rate.

DETAILED DESCRIPTION

In the following disclosure, embodiments will be described with reference to an insulin infusion pump. The present disclosure is however not limited to such application and may equally well be deployed with injection devices that inject other medicaments.

Figure 1:
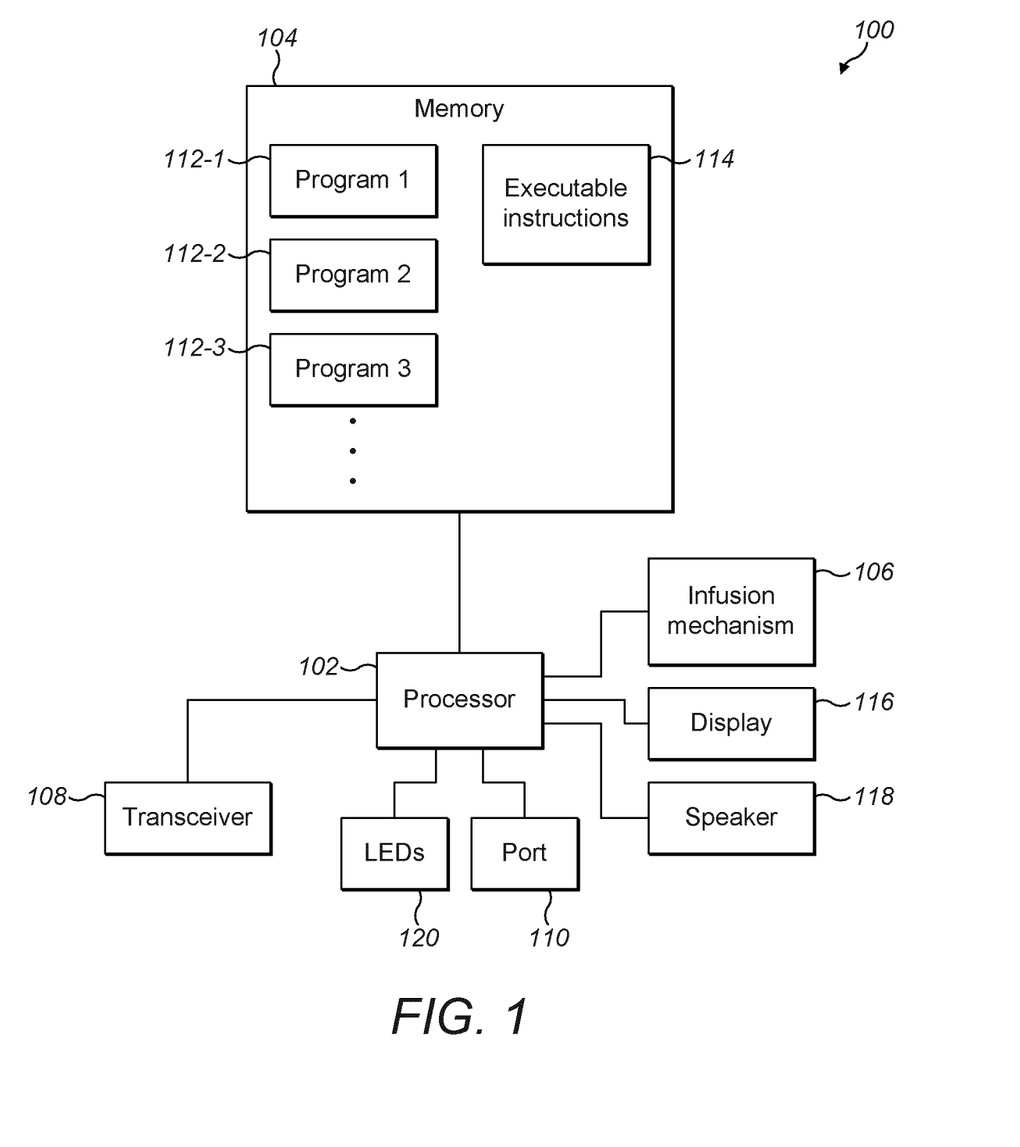
FIG. 1 is a schematic illustration of an insulin infusion pump.

FIG. 1 is a schematic illustration of an insulin infusion pump 100 (also referred to herein as an infusion device) comprising a processor 102, a memory 104, an infusion mechanism 106, a transceiver 108 and a port 110. The infusion pump may for example be a wearable device such as a portable patch pump and may be operated by the patient. In some other embodiments, the infusion pump is a larger volume device designed to be used in a clinical or hospital setting and operated only by a qualified Health Care Professional.

The processor 102 may for instance be a microprocessor, microcontroller, a Digital Signal Processor (DSP), Application Specific Integrated Circuit (ASIC), Field Programmable Gate Array (FPGA) or the like and may also comprise RAM.

The memory 104 may store both program code (e.g. software or firmware) and data. The processor 102 is configured to execute the program code stored in the memory and to read, write and/or delete data from the memory 104. The memory 104 may be a Read-Only Memory (ROM) or a writable memory such as a flash memory or solid state drive. The memory 104 stores a number of pre-set programs 112-1, 112-2, 112-3 etc. and/or a set of executable instructions 114. Each of the pre-set programs 112-1, 112-2, 112-3 defines an infusion rate or infusion profile to be used by the infusion pump 100. The processor 102 uses the executable instructions 114 to control the infusion mechanism 106 to deliver insulin at a rate defined by one of the pre-set programs 112-1, 112-2, 112-3.

The infusion pump 100 also has a transceiver 108 for two way communication with a portable memory device (described with reference to FIGS. 2a-2c) and a port 110 for receiving and reading a portable memory device. The infusion pump 100 may include both the transceiver 108 and port 110, or only one of these components, depending on the design.

The infusion pump 100 may optionally include a display 116, a speaker 118 and one or more LEDs 120 for providing information and feedback to users.

The infusion pump 100 may be of the disposable kind, intended for a single use by a patient or for a small number of uses. For example, the infusion pump may be a wearable patch pump designed for single patient use. In some other embodiments, the infusion pump is a larger volume device designed to be used in a clinical or hospital setting and operated only by a qualified Health Care Professional.

Figure 2A:
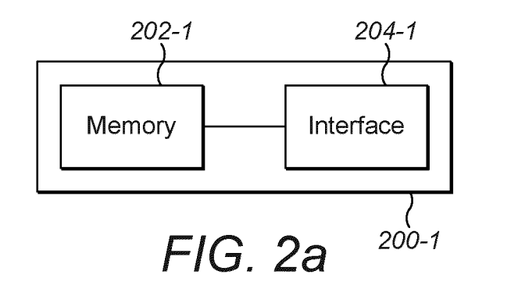
FIGS. 2a, 2b and 2c show three different designs of a portable memory device.
Figure 2B:
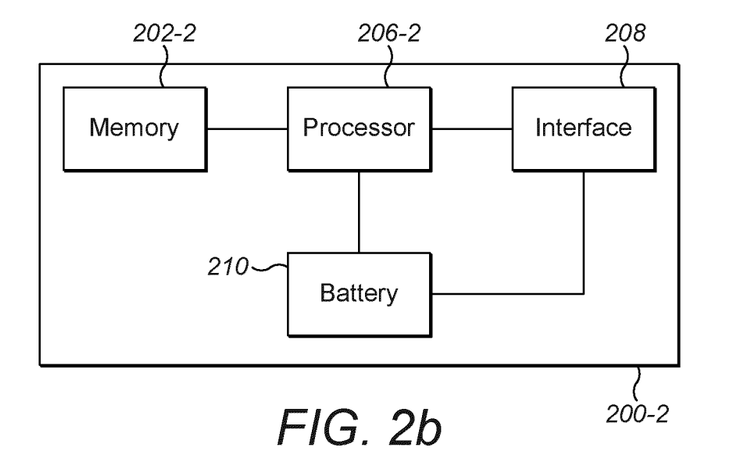
Figure 2C:
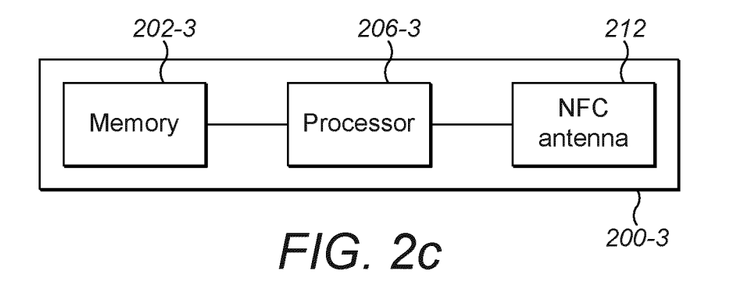

Referring now to FIGS. 2a, 2b, and 2c, three different designs of a portable memory device 200 are shown. In some embodiments, the portable memory devices 200 may be colour-coded to indicate the predefined infusion rate stored therein. For example, the whole housing of the portable memory devices 200 may be made of a coloured material, such as plastic.

The first portable memory device 200-1 shown in FIG. 2a comprises a memory 202-1 and an interface 204-1. The memory 202-1 is a read only memory. In some embodiments, the memory 202-1 cannot be reprogrammed after manufacture. The interface 204-1 allows the portable memory device to be connected to the port 110 of the infusion pump 100 of FIG. 1 and to be read by the infusion pump. The interface 204-1 may comprise a number of electrical contacts which permit the exchange of data with the port 110 electronically. The memory 202-1 stores information relating to a predefined infusion rate. This information may be an indication of a pre-set program stored in the memory 104 of the infusion pump 100. Alternatively, or in addition, the information may define the infusion rate in suitable units such as mL/hour or units/hour. In some other embodiments, the memory 202-1 stores both information defining the infusion rate and the executable instructions required by the infusion pump 100 to control the administration of the medicament contained in the infusion pump.

The port 110 of the infusion pump 100 is sized so as to receive at least the interface 204-1 of the first portable memory device 200-1. Both the port 110 and interface 204-1 may have corresponding irregular shapes to ensure that the infusion pump 100 is unable to accept memory devices designed for other purposes. When the first portable memory device 200-1 is inserted into the port 110, the memory 202-1 is automatically read by the infusion pump 100 and the information therein is retrieved. This retrieval of information occurs automatically and without any further user input or programming at either the infusion pump 100 or first portable memory device 200-1. In embodiments where the information defines the infusion rate explicitly, the processor 102 then uses the executable instructions 114 to program the infusion pump 100 with the defined infusion rate. In embodiments where the information indicates one of the pre-set programs stored in the memory 104 of the infusion pump 100, the processor 102 then uses the executable instructions 114 to program the infusion pump 100 with the infusion rate defined by the indicated program. In embodiments where the information contains the executable instructions as well as the information defining the infusion rate, the processor 102 uses the executable instructions provided by the first portable memory device 200-1 to program the infusion pump 100 accordingly.

Referring to FIG. 2b, a second portable memory device 200-2 is shown. The second portable memory device 200-2 also comprises a memory 202-2 which may be similar or identical to the memory 202-1. The memory 202-2 is a read only memory. In some embodiments, the memory 202-2 cannot be reprogrammed after manufacture. The second portable memory device 200-2 also comprises a processor 206-2, transceiver 208 and battery 210. The processor 206-2 is configured to control the transceiver 208 to at least transmit information stored in the memory 202-2. The transceiver 208 may allow the second portable memory device 200-2 to communicate at radio frequencies, for example by using the industrial, scientific and medical (ISM) radio band. The transceiver 208 may be configured only for short range communication.

The battery 210 is configured to provide electrical power to both the processor 206-2 and the transceiver 208. The second portable memory device 200-2 may be configured to determine when it is brought into proximity with the infusion pump 100. For example, the transceiver 108 of the infusion pump 100 may periodically or continuously broadcast a signal receivable by the transceiver 208. This signal may comprise an identifier of the infusion pump 100 or may be a more generic presence notification. The strength of this signal may be such that it is only detectable by the second portable memory device 200-2 when it is in close proximity to the infusion pump 100, such as within 10 cm. Alternatively, the second portable memory device 200-2 may be configured only to recognise the proximity of the infusion pump 100 when the signal strength detected by the transceiver 208 exceeds a predetermined threshold. In practice, this may only occur when the second portable memory device 200-2 is placed against the housing of the infusion pump 100.

When the second portable memory device 200-2 determines that it is proximity to the infusion pump 100 the information stored in the memory 202-2 is transmitted to the infusion pump via the transceivers 208/108 of each device. This transmission of information occurs automatically and without any further user input or programming at either the infusion pump 100 or second portable memory device 200-2. In embodiments where the information defines the infusion rate explicitly, the processor 102 then uses the executable instructions 114 to program the infusion pump 100 with the defined infusion rate. In embodiments where the information indicates one of the pre-set programs stored in the memory 104 of the infusion pump 100, the processor 102 then uses the executable instructions 114 to program the infusion pump 100 with the infusion rate defined by the indicated program. In embodiments where the information contains the executable instructions as well as the information defining the infusion rate, the processor 102 uses the executable instructions provided by the second portable memory device 200-2 to program the infusion pump 100 accordingly.

Referring to FIG. 2c, a third portable memory device 200-3 is shown. The third portable memory device 200-3 also comprises a memory 202-3 which may be similar or identical to the memories 202-1 and 202-2. The memory 202-3 is a read only memory. In some embodiments, the memory 202-3 cannot be reprogrammed after manufacture. The third portable memory device 200-3 also comprises a processor 206-3 which may be similar or identical in construction to the processor 206-2. The third portable memory device 200-3 includes an NFC antenna 212. In some embodiments, the third portable memory device 200-3 comprises an internal power source (not shown) to provide power to at least the processor 206-3. In some other embodiments, the third portable memory device 200-3 has no internal power source and is reliant on signals emitted by the transceiver 108 of the infusion pump 100 to provide the power necessary to transmit the information stored in the memory 202-3, in the manner of a proximity card or RFID tag. The NFC antenna 212 may be configured to operate in the ISM radio band.

The transceiver 108 of the infusion pump 100 may periodically or continuously broadcast a signal receivable by the NFC antenna 212. For example, the infusion pump 100 may transmit at radio frequencies using the ISM radio band. When the third portable memory device 200-3 is brought into proximity with the infusion pump 100, the signals emitted by the transceiver 108 induce a current in the NFC antenna 212. The processor 206-3 uses the energy absorbed from the signals to transmit the information stored in the memory 202-3 using the NFC antenna 212. This transmission of information occurs automatically and without any further user input or programming at either the infusion pump 100 or third portable memory device 200-3. In embodiments where the information defines the infusion rate explicitly, the processor 102 then uses the executable instructions 114 to program the infusion pump 100 with the defined infusion rate. In embodiments where the information indicates one of the pre-set programs stored in the memory 104 of the infusion pump 100, the processor 102 then uses the executable instructions 114 to program the infusion pump 100 with the infusion rate defined by the indicated program. In embodiments where the information contains the executable instructions as well as the information defining the infusion rate, the processor 102 uses the executable instructions provided by the third portable memory device 200-3 to program the infusion pump 100 accordingly.

The effective range of the NFC antenna 212 may be very short, for example less than 5 cm. This is advantageous since it can prevent accidental programming of the infusion pump 100. The housing of the infusion pump 100 may be provided with an area containing an indication that the third portable memory device 206-3 should be placed close to or against the housing on this area in order to affect transmission of the information stored in the memory device.

It will be understood that the portable memory devices 200 shown in FIGS. 2a, 2b and 2c are schematic and omit certain other components which may be necessary for operation of the devices, such as capacitors, resistors, secondary memories, antennas and other standard circuit components and connections.

Whatever the design of the portable memory device 200, once the infusion pump 100 has been successfully programmed with the predefined infusion rate, the executable instructions 114 cause the infusion pump 100 to output a confirmation that the infusion pump has been properly programmed. This feedback may be provided visually on the display 116 and/or by an auditory notification provided via the speaker 118. In some other embodiments, one or more coloured LEDs 120 may illuminate to indicate that the infusion pump has been properly programmed. In embodiments where the portable memory device 200 is colour-coded, these LEDs 120 may be configured to emit light matched to the colour of the inserted portable memory device in order to provide the confirmation that the infusion pump 100 has been properly programmed. The LEDs 120 may be provided instead of the display 116 and/or speaker 18, or in addition to these components. For example, where the infusion pump is a single-use disposable device, it may be advantageous to omit the display 116 and speaker 18 and to provide user feedback solely through the use of coloured LEDs.

In embodiments compatible with the first portable memory device 200-1, once the infusion pump has confirmed that it has been properly programmed with the predefined infusion rate, the user removes the portable memory device 200 from the port 110. In some other embodiments, the portable memory device 200 remains within the port 110 until the infusion process is complete to prevent the possibility of reprogramming of the infusion pump mid-infusion. In some embodiments, both the infusion pump 100 and the first portable memory device 200-1 are disposable the memory device cannot be removed from the infusion pump 100 once it has been inserted.

In the embodiments shown and described with reference to FIGS. 2b and 2c, the portable memory device 200 needs only to be brought into proximity or contact with the infusion pump 100 in order to program infusion pump. The portable memory devices 200-2/200-3 can be used multiple times to program different infusion pumps 100. Conversely, the infusion pump 100 is configured to receive programming instructions from different portable memory devices 200-2/200-3 and to be reprogrammed multiple times.

In all embodiments, the infusion pump 100 may be unable to change the programmed infusion rate until a different portable memory device 200 is inserted into or brought into proximity with the infusion pump. Alternatively, some limited adjustment of the set infusion rate may be permitted.

The portable memory devices 200 described above are advantageous for users of infusion pumps as they reduced the burden to correctly program the infusion pump and reduce the possibility of error on the part of the user when doing so. The complexity and possibility of error when programming infusion pumps may be a deterrent for many users to engage with self-medication therapies, increasing the burden on healthcare infrastructure and healthcare professionals. This may particularly be the case for users who are unfamiliar with such technology or who have impaired eyesight or dexterity. Providing a system in which infusion pumps 100 can be automatically programmed with a range of different predefined infusion rates without the user needing to manually enter any information alleviates this problem. Providing portable memory devices which cause the infusion pump not only to be automatically programmed with the correct infusion rate, but to output a confirmation that it has been properly programmed, results in a system which is intuitive and easy to use for all users.

In yet further embodiments, the portable memory device 200 is integrated with a container of medicament or co-packaged with a pharmaceutical product intended for intravenous delivery. Therefore, when the container of medicament is connected to the infusion pump 100, the infusion pump is also programmed with the predefined infusion rate stored in the portable memory device. This is advantageous, since it reduces the chances of an incorrect infusion rate being programmed by a user of the infusion pump 100. For example, the infusion pump 100 may be used in a hospital setting to deliver a wide range of different medicaments requiring different infusion rates. Packaging the portable memory device 200 with pharmaceutical product allows a product to be positively identified when the portable memory device is inserted into the infusion pump 100, which reduces the chances of an incorrect medicament being administered to a patient. The medicament name and other key attributes (e.g. concentration) may be displayed on the display 116 of the infusion pump 100. Furthermore, delivering a medicament at a rate which is too high or too low could be potentially very dangerous for the patient. Providing a system in which the infusion pump 100 is automatically programmed with the predefined infusion rate and the nurse or health care professional needs only to verify that the correct rate has been programmed may significantly reduce the chances of error.

The portable memory devices 200 may also introduce certain protections to prevent the programming of dangerous or contradictory infusion rates. For example, the use of a portable memory device 200 with the infusion pump 100 could prevent any other infusion rate other than that defined by the portable memory device 200 from being programmed into the infusion pump 100. In some embodiments, the infusion pump 100 may have no user input capability and the only way to program the infusion pump is through the use of the portable memory devices 200. In some other embodiments the infusion pump 100 may retain the ability to receive infusion rate inputs from a user. In these embodiments, once an infusion rate has been set, it can only be adjusted within a limited range, in order to prevent the programming of a potentially dangerous infusion rate.

The infusion device 100 may be provided with audible and/or visual alarms to alert the user and others if an infusion rate different from that defined by the portable memory device 200 is programmed into the infusion device. The display 116 and/or speaker 118 may be used to provide these alarms. In some embodiments, if a user attempts to program an infusion rate that is outside of a predefined range, the infusion device 100 may induce an electronic lock-out function that prevents the infusion mechanism 106 from being operated.

The portable memory devices 200 and infusion pump 100 described above may have different use scenarios. For example, the infusion pump may be intended for home use by a patient and may be programmed using the portable memory devices 200 by the patient's Health Care Professional or by the patient themselves. Alternatively, the infusion pump may be intended for use in a hospital or clinic and is operated and programmed by a nurse or other Health Care Professional. These use scenarios are discussed in greater detail with reference to the flow charts of FIGS. 3-5.

Figure 3:
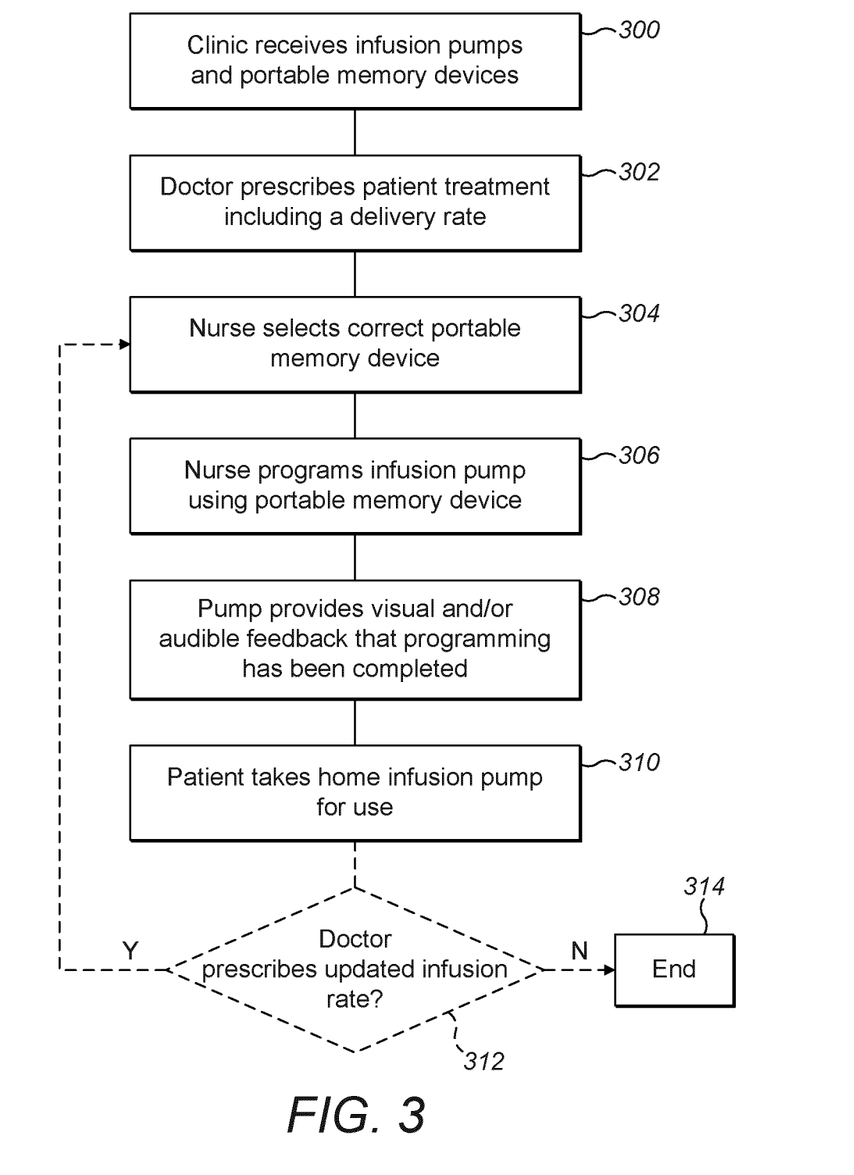
FIG. 3 is a flowchart showing exemplary use of the portable memory devices of FIGS. 2a, 2b and 2c and the infusion pump of FIG. 1 in a home use setting in which the infusion pump is programmed by a nurse, pharmacist or other Health Care Professional.

FIG. 3 is a flowchart showing exemplary use of the portable memory devices 200 and infusion pump 100 in a home use setting (e.g. for insulin therapy) in which the infusion pump 100 is programmed by a nurse, pharmacist or other Health Care Professional.

In step 300 a clinic or Health Care Professional office receives generic infusion pumps 100 as well as associated portable memory devices 200. The portable memory devices 200 may represent a range of different infusion rates and may have a housing which is colour coded according to the infusion rate stored in the respective portable memory device 200.

At step 302 a doctor or other Health Care Professional prescribes a patient treatment including an infusion delivery rate. The infusion delivery rate may be specified in ml/hour or units/hour, for example. The doctor may also note a colour of the portable memory device 200 corresponding to the prescribed infusion rate, or a program may automatically do this. The colour information may be added to the prescription.

A nurse or other Health Care Professional then provides the infusion pump to the patient. At step 304 the nurse or other Health Care Professional selects the correct portable memory device 200 as indicated in the patient prescription. Any colour coding of the portable memory devices 200 assists the nurse in confirming that the correct portable memory device 200 has been chosen. At step 306 the nurse or other Health Care Professional uses the portable memory device 200 to program the infusion pump, as described in detail above with reference to FIGS. 2a, 2b and 2c. As part of providing the infusion pump 100 to the patient, the nurse may also provide training to the patient on the use of the infusion pump 100.

At step 308, the infusion pump 100 provides visual and/or audible feedback that the programming has been completed. For example, a message may be displayed on the display 116 of the infusion pump stating that the infusion pump is now programmed and indicated the infusion rate set. Alternatively, or in addition the confirmation may comprise a graphic or animation. The visual indication may be accompanied by a sound emitted by the speaker 118, such as a series of tones. In some embodiments, the infusion pump 100 does not have a display and only the audible feedback is provided. In some other embodiments, the infusion pump 100 comprises one or more LEDs 120. These LEDs 120 may be used to provide the feedback that the infusion pump 100 has been correctly programmed. In some embodiments, a number of different coloured LEDs 120 may be provided on the housing of the infusion pump 100 such that they are clearly visible to a user. The LEDs 120 may be colour coded with the portable memory devices 200. An LED 120 of the corresponding colour may illuminate or flash to indicate successful programming of the infusion pump 100 with a portable memory device 200.

After successful programming of the infusion pump 100 the nurse delivers the infusion pump the patient and at step 310 the patient takes the infusion pump home for use. In the embodiment of FIG. 3 the patient does not take possession of the portable memory device 200 and so cannot re-program the infusion pump 100 once it is in their possession. Even if the infusion device has a user interface for setting an infusion rate, this feature may be electronically locked-out by use of the portable memory device 200, thus preventing any accidental or deliberate re-programming of the infusion rate.

In optional step 312, the doctor or other Health Care Professional determines whether an updated infusion rate is required. For example, the patient's records may indicate that a different infusion rate would yield better therapeutic outcomes than the one original prescribed, or the patient may be on a treatment plan than requires a changing infusion rate. If no changes are required then the process ends at step 314. If the user requires further infusion therapy, then this may continue according to their original prescription. If changes are required, then the doctor prescribes a new infusion rate in step 312 and the process returns to step 304.

A benefit of the use scenario described in FIG. 3 is that the patient is not required to engage in any programming of the infusion pump 100. Some patients may be unwilling or unable to program the infusion pump 100 and this allows them to be provided with a generic infusion pump programmed with their prescribed infusion rate. Moreover, the manufacturer of the infusion pump can provide a single type of infusion pump to the clinic and rely on the doctor/nurse to correctly configure the infusion pump for patient use.

Figure 4:
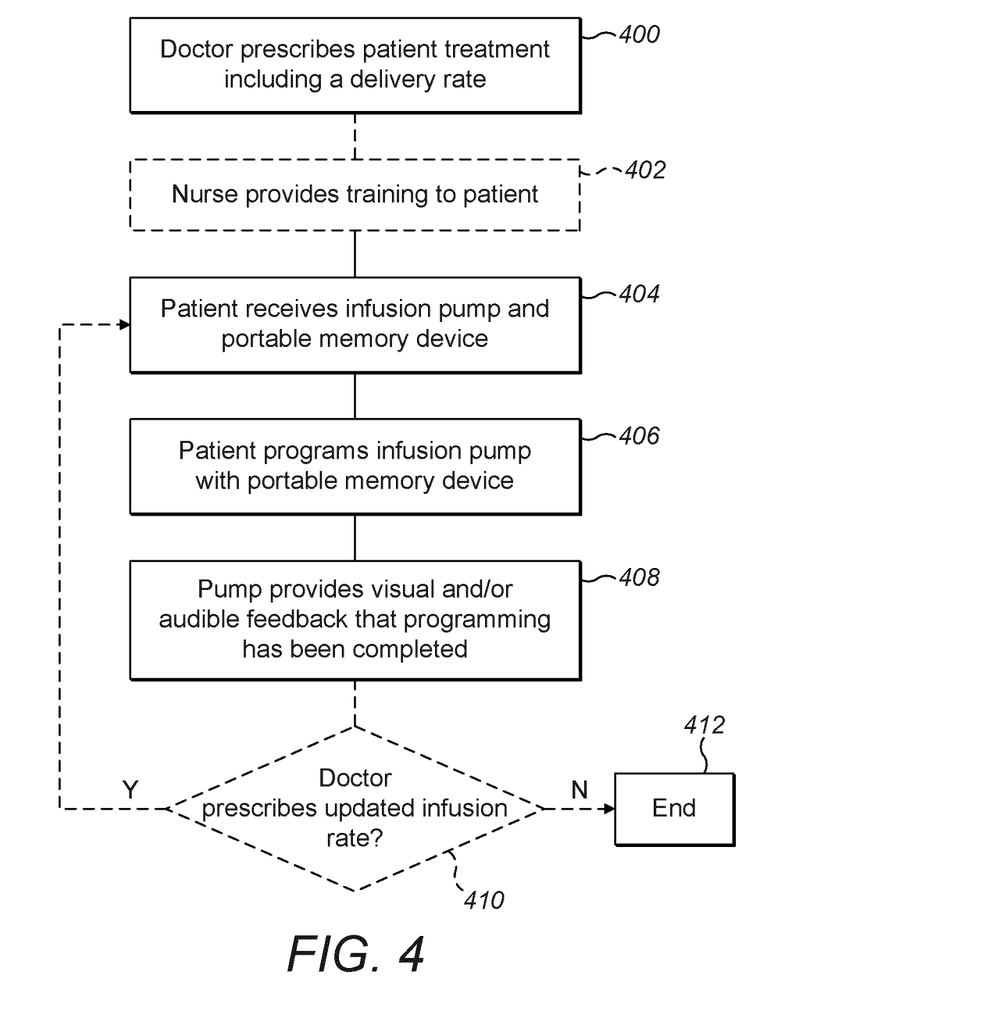
FIG. 4 is a flowchart showing exemplary use of the portable memory devices of FIGS. 2a, 2b and 2c and the infusion pump of FIG. 1 in a home use setting in which the infusion pump is programmed by the patient.

FIG. 4 is a flowchart showing exemplary use of the portable memory devices 200 and infusion pump 100 in a home use setting (e.g. for insulin therapy) in which the infusion pump 100 is programmed by the patient.

At step 400, a doctor or other Health Care Professional prescribes a patient treatment including an infusion delivery rate. The infusion delivery rate may be specified in ml/hour or units/hour, for example. The doctor may also note a colour of the portable memory device 200 corresponding to the prescribed infusion rate, or a program may automatically do this. The colour information may be added to the prescription.

At optional step 402, a nurse, pharmacist or other Health Care Professional provides training to the patient in the use of the infusion pump. Alternatively, the infusion pump may be provided with written instructions for use.

In step 404, the patient receives the un-programmed infusion pump 100. They may for example collect the infusion pump 100 from a pharmacy or have the infusion pump delivered to their residence. Also as part of step 404, the patient receives a portable memory device 200 which defines an infusion rate according to their prescription. The patient's prescription may indicate the colour code of the portable memory device 200 prescribed to the patient. In some embodiments the portable memory device 200 is integral with a container of medicament or is co-packaged with the container of medicament. The patient can then verify the colour of the portable memory device 200 or combined medicament/memory device against the colour indicated in their prescription.

At step 406 the patient programs the infusion pump 100 with the portable memory device 200, as described in detail above with reference to FIGS. 2a, 2b and 2c. This process is intuitive an easy for the patient as it requires only insertion of the portable memory device 200 into the port 110 of the infusion pump 100 or bringing the portable memory device 200 into proximity with the infusion pump 100.

At step 408, the infusion pump 100 provides visual and/or audible feedback that the programming has been completed. For example, a message may be displayed on the display 116 of the infusion pump stating that the infusion pump is now programmed and indicated the infusion rate set. Alternatively, or in addition the confirmation may comprise a graphic or animation. The visual indication may be accompanied by a sound emitted by the speaker 118, such as a series of tones. In some embodiments, the infusion pump 100 does not have a display and only the audible feedback is provided. In some other embodiments, the infusion pump 100 comprises one or more LEDs 120. These LEDs 120 may be used to provide the feedback that the infusion pump 100 has been correctly programmed. In some embodiments, a number of different coloured LEDs 120 may be provided on the housing of the infusion pump 100 such that they are clearly visible to a user. The LEDs 120 may be colour coded with the portable memory devices 200. An LED 120 of the corresponding colour may illuminate or flash to indicate successful programming of the infusion pump 100 with a portable memory device 200. This feedback reassures the user that their infusion pump 100 is correctly programmed. Although this use scenario requires some user programming of the infusion pump 100, the manner of the programming is extremely simple and so long as the correct portable memory device 200 is provided to the user, there is little possibility for error. If an incorrect portable memory device 200 is provided, then this can be noticed by the user if they are also informed of the colour of portable memory device 200 which corresponds to their prescribed infusion rate.

In optional step 410, the doctor or other Health Care Professional determines whether an updated infusion rate is required. For example, the patient's records may indicate that a different infusion rate would yield better therapeutic outcomes than the one original prescribed, or the patient may be on a treatment plan than requires a changing infusion rate. If no changes are requires then the process ends at step 412. If the user requires further infusion therapy, then this may continue according to their original prescription. If changes are required, then the doctor prescribes a new infusion rate in step 312 and the process returns to step 404. The patient may not receive a new infusion pump 100 since the pump is generic ad re-programmable.

Figure 5:
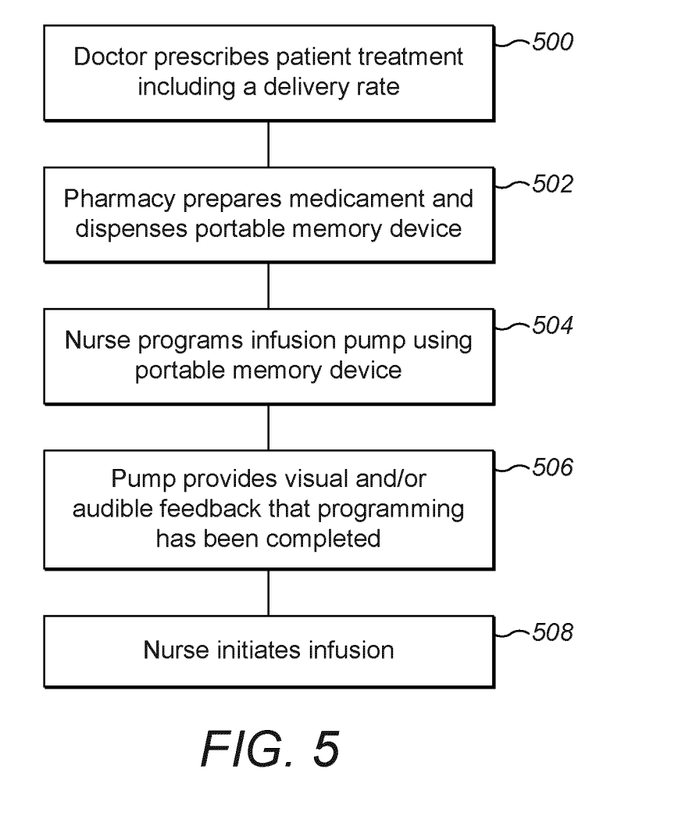
FIG. 5 is a flowchart showing exemplary use of the portable memory devices and infusion pump in a clinical or hospital setting in which the infusion pump is programmed and operated by a Health Care Professional.

FIG. 5 is a flowchart showing exemplary use of the portable memory devices 200 and infusion pump 100 in a clinical or hospital setting in which the infusion pump 100 is programmed and operated by a Health Care Professional.

At step 500, a doctor or other Health Care Professional orders or prescribes a patient treatment including an infusion delivery rate. The infusion delivery rate may be specified in ml/hour or units/hour, for example. The doctor may also note a colour of the portable memory device 200 corresponding to the prescribed infusion rate, or a program may automatically do this. The colour information may be added to the patient's notes.

At step 502, a pharmacy prepares the medicament and dispenses the correct portable memory device 200 according to the order. A first cross-check of the ordered infusion rate can be made by the pharmacist by observing the colour of the portable memory device 200 dispensed with the medicament. In some embodiments, the portable memory device 200 is integral with a container of medicament or is co-packaged with the container of medicament.

At step 504 a nurse or other Health Care Professional prepares the infusion by programming the infusion pump 100 using the portable memory device 200 provided n step 502, as described in detail above with reference to FIGS. 2a, 2b and 2c.

At step 506, the infusion pump 100 provides visual and/or audible feedback that the programming has been completed. For example, a message may be displayed on the display 116 of the infusion pump stating that the infusion pump is now programmed and indicated the infusion rate set. Alternatively, or in addition the confirmation may comprise a graphic or animation. The visual indication may be accompanied by a sound emitted by the speaker 118, such as a series of tones. This feedback allows the nurse to compare the programmed flow rate against that specified in the order. The infusion pump 100 may require positive confirmation that the programmed infusion rate is correct. Having been programmed with the portable memory device 200, the infusion pump 100 may not allow the infusion rate to be adjusted. This helps to prevent a contradictory or dangerous infusion rate from being administered to the patient. In some other embodiments, the amount by which the programmed infusion rate may be adjusted is limited within a predefined range. If the nurse notices a discrepancy between the programmed rate and that specified in the order, or if the colour of the portable memory device 200 does not match that in the order, then the doctor who prescribed the treatment (or a similarly qualified Health Care Professional) may be called to confirm the correct infusion rate and/or provide a new portable memory device 200. This system provides another level of check that the infusion rate is correct, without any impact on the time required by doctors and nurses in prescribing and administering the infusion.

In some embodiments, the infusion pump 100 does not have a display and only the audible feedback is provided. In some other embodiments, the infusion pump 100 comprises one or more LEDs 120. These LEDs 120 may be used to provide the feedback that the infusion pump 100 has been correctly programmed. In some embodiments, a number of different coloured LEDs 120 may be provided on the housing of the infusion pump 100 such that they are clearly visible to a user. The LEDs 120 may be colour coded with the portable memory devices 200. An LED 120 of the corresponding colour may illuminate or flash to indicate successful programming of the infusion pump 100 with a portable memory device 200.

At step 508, the nurse or other Health Care Professional initiates the infusion on the infusion pump 100.

As will be apparent from the embodiments described above, the infusion pump 100 may be of a standardised type. This means that a manufacturer of the infusion pump 100 needs only to design, develop, manufacture and distribute one type of infusion device. The manufacturer does not need to change any aspect of the manufacturing process in order to produce infusion pumps which can be programmed with different infusion rates, but also used easily and without error by patients. This greatly reduces the costs associated with the development and manufacturing process, as well as the logistics of distributing the devise to clinics, pharmacies and patients.

In one particular embodiment, colour coded portable memory devices 200 may be provided which store predefined infusion rates in 1 ml/hour increments. For example, six different portable memory devices 200 may be provided corresponding to predefined infusion rates as follows: White—1 ml/hour; Yellow—2 ml/hour; Blue—3 ml/hour; Green—4 ml/hour; Red—5 ml/hour; Black—6 ml/hour. This embodiment is given only as an example, and other ranges of predefined rates may be provided as well as different increments. Where the infusion pump 100 allows for limited adjustment of the predefined rate, this limited adjustment may be ±0.5 ml/hour, or defined as half of the standard increment between different portable memory devices 200.

The terms "drug" or "medicament" are used synonymously herein and describe a pharmaceutical formulation containing one or more active pharmaceutical ingredients or pharmaceutically acceptable salts or solvates thereof, and optionally a pharmaceutically acceptable carrier. An active pharmaceutical ingredient ("API"), in the broadest terms, is a chemical structure that has a biological effect on humans or animals. In pharmacology, a drug or medicament is used in the treatment, cure, prevention, or diagnosis of disease or used to otherwise enhance physical or mental well-being. A drug or medicament may be used for a limited duration, or on a regular basis for chronic disorders.

As described below, a drug or medicament can include at least one API, or combinations thereof, in various types of formulations, for the treatment of one or more diseases. Examples of API may include small molecules having a molecular weight of 500 Da or less; polypeptides, peptides and proteins (e.g., hormones, growth factors, antibodies, antibody fragments, and enzymes); carbohydrates and polysaccharides; and nucleic acids, double or single stranded DNA (including naked and cDNA), RNA, antisense nucleic acids such as antisense DNA and RNA, small interfering RNA (siRNA), ribozymes, genes, and oligonucleotides. Nucleic acids may be incorporated into molecular delivery systems such as vectors, plasmids, or liposomes. Mixtures of one or more drugs are also contemplated.

The drug or medicament may be contained in a primary package or "drug container" adapted for use with a drug delivery device. The drug container may be, e.g., a cartridge, syringe, reservoir, or other solid or flexible vessel configured to provide a suitable chamber for storage (e.g., short- or long-term storage) of one or more drugs. For example, in some instances, the chamber may be designed to store a drug for at least one day (e.g., 1 to at least 30 days). In some instances, the chamber may be designed to store a drug for about 1 month to about 2 years. Storage may occur at room temperature (e.g., about 20° C.), or refrigerated temperatures (e.g., from about −4° C. to about 4° C.). In some instances, the drug container may be or may include a dual-chamber cartridge configured to store two or more components of the pharmaceutical formulation to-be-administered (e.g., an API and a diluent, or two different drugs) separately, one in each chamber. In such instances, the two chambers of the dual-chamber cartridge may be configured to allow mixing between the two or more components prior to and/or during dispensing into the human or animal body. For example, the two chambers may be configured such that they are in fluid communication with each other (e.g., by way of a conduit between the two chambers) and allow mixing of the two components when desired by a user prior to dispensing. Alternatively or in addition, the two chambers may be configured to allow mixing as the components are being dispensed into the human or animal body.

The drugs or medicaments contained in the drug delivery devices as described herein can be used for the treatment and/or prophylaxis of many different types of medical disorders. Examples of disorders include, e.g., diabetes mellitus or complications associated with diabetes mellitus such as diabetic retinopathy, thromboembolism disorders such as deep vein or pulmonary thromboembolism. Further examples of disorders are acute coronary syndrome (ACS), angina, myocardial infarction, cancer, macular degeneration, inflammation, hay fever, atherosclerosis and/or rheumatoid arthritis. Examples of APIs and drugs are those as described in handbooks such as Rote Liste 2014, for example, without limitation, main groups 12 (anti-diabetic drugs) or 86 (oncology drugs), and Merck Index, 15th edition.

Examples of APIs for the treatment and/or prophylaxis of type 1 or type 2 diabetes mellitus or complications associated with type 1 or type 2 diabetes mellitus include an insulin, e.g., human insulin, or a human insulin analogue or derivative, a glucagon-like peptide (GLP-1), GLP-1 analogues or GLP-1 receptor agonists, or an analogue or derivative thereof, a dipeptidyl peptidase-4 (DPP4) inhibitor, or a pharmaceutically acceptable salt or solvate thereof, or any mixture thereof. As used herein, the terms "analogue" and "derivative" refers to a polypeptide which has a molecular structure which formally can be derived from the structure of a naturally occurring peptide, for example that of human insulin, by deleting and/or exchanging at least one amino acid residue occurring in the naturally occurring peptide and/or by adding at least one amino acid residue. The added and/or exchanged amino acid residue can either be codable amino acid residues or other naturally occurring residues or purely synthetic amino acid residues. Insulin analogues are also referred to as "insulin receptor ligands". In particular, the term "derivative" refers to a polypeptide which has a molecular structure which formally can be derived from the structure of a naturally occurring peptide, for example that of human insulin, in which one or more organic substituent (e.g. a fatty acid) is bound to one or more of the amino acids. Optionally, one or more amino acids occurring in the naturally occurring peptide may have been deleted and/or replaced by other amino acids, including non-codeable amino acids, or amino acids, including non-codeable, have been added to the naturally occurring peptide.

Examples of insulin analogues are Gly(A21), Arg(B31), Arg(B32) human insulin (insulin glargine); Lys(B3), Glu (B29) human insulin (insulin glulisine); Lys(B28), Pro(B29) human insulin (insulin lispro); Asp(B28) human insulin (insulin aspart); human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Examples of insulin derivatives are, for example, B29-N-myristoyl-des(B30) human insulin, Lys(B29) (N-tetradecanoyl)-des(B30) human insulin (insulin detemir, Levemir®); B29-N-palmitoyl-des (B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N—(N-palmitoyl-gamma-glutamyl)-des(B30) human insulin, B29-N-omega-carboxypentadecanoyl-gamma-L-glutamyl-des(B30) human insulin (insulin degludec, Tresiba®); B29-N—(N-lithocholyl-gamma-glutamyl)-des(B30) human insulin; B29-N-(ω-carboxyheptadecanoyl)-des(B30) human insulin and B29-N-(ω-carboxyheptadecanoyl) human insulin.

Examples of GLP-1, GLP-1 analogues and GLP-1 receptor agonists are, for example, Lixisenatide (Lyxumia®), Exenatide (Exendin-4, Byetta®, Bydureon®, a 39 amino acid peptide which is produced by the salivary glands of the Gila monster), Liraglutide (Victoza®), Semaglutide, Taspoglutide, Albiglutide (Syncria®), Dulaglutide (Trulicity®), rExendin-4, CJC-1134-PC, PB-1023, TTP-054, Langlenatide/HM-11260C, CM-3, GLP-1 Eligen, ORMD-0901, NN-9924, NN-9926, NN-9927, Nodexen, Viador-GLP-1, CVX-096, ZYOG-1, ZYD-1, GSK-2374697, DA-3091, MAR-701, MAR709, ZP-2929, ZP-3022, TT-401, BHM-034. MOD-6030, CAM-2036, DA-15864, ARI-2651, ARI-2255, Exenatide-XTEN and Glucagon-Xten.

An example of an oligonucleotide is, for example: mipomersen sodium (Kynamro®), a cholesterol-reducing antisense therapeutic for the treatment of familial hypercholesterolemia.

Examples of DPP4 inhibitors are Vildagliptin, Sitagliptin, Denagliptin, Saxagliptin, Berberine.

Examples of hormones include hypophysis hormones or hypothalamus hormones or regulatory active peptides and their antagonists, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, and Goserelin.

Examples of polysaccharides include a glucosaminoglycane, a hyaluronic acid, a heparin, a low molecular weight heparin or an ultra-low molecular weight heparin or a derivative thereof, or a sulphated polysaccharide, e.g. a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium. An example of a hyaluronic acid derivative is Hylan G-F 20 (Synvisc®), a sodium hyaluronate.

The term "antibody", as used herein, refers to an immunoglobulin molecule or an antigen-binding portion thereof. Examples of antigen-binding portions of immunoglobulin molecules include F(ab) and F(ab')2 fragments, which retain the ability to bind antigen. The antibody can be polyclonal, monoclonal, recombinant, chimeric, de-immunized or humanized, fully human, non-human, (e.g., murine), or single chain antibody. In some embodiments, the antibody has effector function and can fix complement. In some embodiments, the antibody has reduced or no ability to bind an Fc receptor. For example, the antibody can be an isotype or subtype, an antibody fragment or mutant, which does not support binding to an Fc receptor, e.g., it has a mutagenized or deleted Fc receptor binding region. The term antibody also includes an antigen-binding molecule based on tetravalent bispecific tandem immunoglobulins (TBTI) and/or a dual variable region antibody-like binding protein having cross-over binding region orientation (CODV).

The terms "fragment" or "antibody fragment" refer to a polypeptide derived from an antibody polypeptide molecule (e.g., an antibody heavy and/or light chain polypeptide) that does not comprise a full-length antibody polypeptide, but that still comprises at least a portion of a full-length antibody polypeptide that is capable of binding to an antigen. Antibody fragments can comprise a cleaved portion of a full length antibody polypeptide, although the term is not limited to such cleaved fragments. Antibody fragments that are useful in the present disclosure include, for example, Fab fragments, F(ab')2 fragments, scFv (single-chain Fv) fragments, linear antibodies, monospecific or multispecific antibody fragments such as bispecific, trispecific, tetraspecific and multispecific antibodies (e.g., diabodies, triabodies, tetrabodies), monovalent or multivalent antibody fragments such as bivalent, trivalent, tetravalent and multivalent antibodies, minibodies, chelating recombinant antibodies, tribodies or bibodies, intrabodies, nanobodies, small modular immunopharmaceuticals (SMIP), binding-domain immunoglobulin fusion proteins, camelized antibodies, and VHH containing antibodies. Additional examples of antigen-binding antibody fragments are known in the art.

The terms "Complementarity-determining region" or "CDR" refer to short polypeptide sequences within the variable region of both heavy and light chain polypeptides that are primarily responsible for mediating specific antigen recognition. The term "framework region" refers to amino acid sequences within the variable region of both heavy and light chain polypeptides that are not CDR sequences, and are primarily responsible for maintaining correct positioning of the CDR sequences to permit antigen binding. Although the framework regions themselves typically do not directly participate in antigen binding, as is known in the art, certain residues within the framework regions of certain antibodies can directly participate in antigen binding or can affect the ability of one or more amino acids in CDRs to interact with antigen. Examples of antibodies are anti PCSK-9 mAb (e.g., Alirocumab), anti IL-6 mAb (e.g., Sarilumab), and anti IL-4 mAb (e.g., Dupilumab).

Pharmaceutically acceptable salts of any API described herein are also contemplated for use in a drug or medicament in a drug delivery device. Pharmaceutically acceptable salts are for example acid addition salts and basic salts.

Those of skill in the art will understand that modifications (additions and/or removals) of various components of the APIs, formulations, apparatuses, methods, systems and embodiments described herein may be made without departing from the full scope of the present disclosure, which encompass such modifications and any and all equivalents thereof. In this regard, due account shall be taken of any element which is equivalent to an element specified in the claims.

The invention claimed is:

1. A portable memory device storing information that, when received by an infusion device, causes the infusion device to
set as a predefined infusion rate an infusion rate defined by one of a plurality of predefined infusion profiles stored in a memory of the infusion device, wherein each of the plurality of predefined infusion profiles includes data representing a respective infusion rate, and wherein the one of the plurality of predefined infusion profiles is determined according to a color of a housing of the portable memory device, and
output a confirmation that the infusion device has been properly programmed with the predefined infusion rate, wherein the confirmation is represented by automatically illuminating one of a plurality of differently colored LEDs of the infusion device that corresponds to the color of the housing of the portable memory device,
wherein the portable memory device is configured to automatically transmit the information to the infusion device without receiving user input at the infusion device or the portable memory device, in response to the portable memory device being brought into a transmitting position with respect to the infusion device.

2. The portable memory device according to claim 1, wherein the transmitting position is a non-contact position between the portable memory device and the infusion device.

3. The portable memory device according to claim 2, wherein the portable memory device is configured to use a radio frequency band to transmit information to the infusion device.

4. The portable memory device according to claim 1, wherein the information comprises an indication of one of the plurality of predefined infusion profiles stored in the memory of the infusion device.

5. The portable memory device according to claim 1, wherein the information comprises executable instructions configured to be executed by the infusion device to cause the infusion device to set the predefined infusion rate.

6. The portable memory device according to claim 1, wherein the memory comprises a read only memory,
wherein the portable memory device is further configured to automatically transmit the data relating to the predefined infusion rate to the infusion device when the portable memory device is brought into the transmitting position with respect to the infusion device.

7. The portable memory device according to claim 1, wherein the information, when received by the infusion device, further causes the infusion device to prevent any change in the predefined infusion rate until a further portable memory device is brought into the transmitting position with respect to the infusion device.

8. The portable memory device according to claim 1, wherein the transmitting position requires the portable memory device to be inserted into a port of the infusion device.

9. The portable memory device according to claim 1, wherein the transmitting position requires the portable memory device to be placed against a housing of the infusion device.

10. The portable memory device according to claim 1, wherein the portable memory device is integrated with a container of medicament that is configured to be connected to the infusion device such that medicament contained in the container of medicament is deliverable by the infusion device.

11. An infusion device comprising:
a receiver configured to receive information from a portable memory device in response to the portable memory device being brought into a transmitting position with respect to the infusion device without receiving user input at the infusion device or the portable memory device;
a memory configured to store a plurality of predefined infusion profiles, wherein each of the plurality of predefined infusion profiles includes data representing a respective infusion rate;
a processor configured to read the information received by the receiver and in response,
determine, from the plurality of predefined infusion profiles, a predefined infusion rate according to a color of a housing of the portable memory device, and
set the predefined infusion rate for the infusion device; and
a plurality of differently colored LEDs,
wherein the infusion device is further configured to automatically illuminate one of the plurality of differently colored LEDs that corresponds to the color of the housing of the portable memory device to provide a confirmation that the infusion device has been properly programmed with the predefined infusion rate.

12. The infusion device according to claim 11, further comprising a display device,
wherein the confirmation that the infusion device has been properly programmed is automatically outputted by being visually displayed on the display device.

13. The infusion device according to claim 11, wherein the infusion device further comprises a speaker,
wherein the confirmation that the infusion device has been properly programmed is automatically outputted by being audibly indicated using the speaker.

14. The infusion device according to claim 11, wherein the infusion device is further configured such that the predefined infusion rate set by the processor, cannot be adjusted manually.

15. The infusion device according to claim 11, wherein the infusion device allows adjustment of the predefined infusion rate within a predefined range of the predefined infusion rate set by the processor.

16. A medical device system comprising:
an infusion device; and
a portable memory device for use with the infusion device, the portable memory device comprising a memory that stores information,
wherein the portable memory device is configured to automatically transmit the information to the infusion device, without receiving user input at the infusion device or the portable memory device, in response to the portable memory device being brought into a transmitting position with respect to the infusion device,
wherein the infusion device comprises
a receiver configured to receive the information from the portable memory device in response to the portable memory device being brought into the transmitting position with respect to the infusion device,
a memory configured to store a plurality of predefined infusion profiles, wherein each of the plurality of predefined infusion profiles includes data representing a respective infusion rate, and
a processor configured to read the information received by the receiver and in response,
determine, from the plurality of predefined infusion profiles, a predefined infusion rate according to a color of a housing of the portable memory device, and
set the predefined infusion rate for the infusion device, and
wherein in response to receiving the information from the portable memory device, the infusion device is further configured to automatically illuminate one of a plurality of differently colored LEDs that corresponds to the color of the housing of the portable memory device to provide a confirmation that the infusion device has been properly programmed with the predefined infusion rate.

17. The system of claim 16, further comprising a container of medicament configured to be connected to the infusion device such that medicament contained in the container of medicament is deliverable by the infusion device, wherein the portable memory device is integral or co-packaged with the container of medicament.

* * * * *